Nov. 28, 1944. H. C. WILLIAMS 2,363,919
AUTOGRAPHIC REGISTER TICKET FOR CLEANERS AND DYERS
Filed Oct. 1, 1943
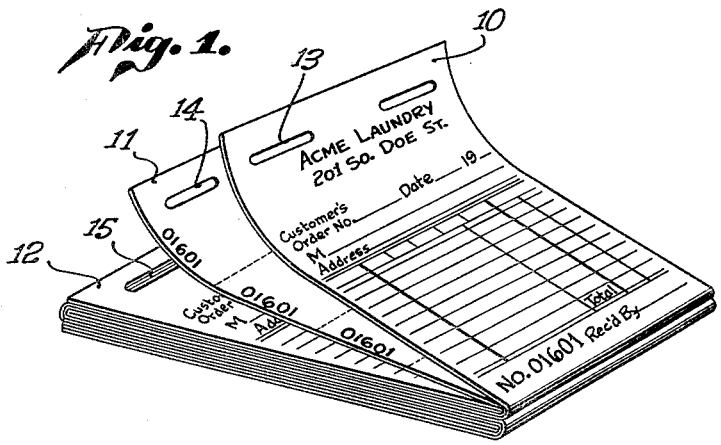
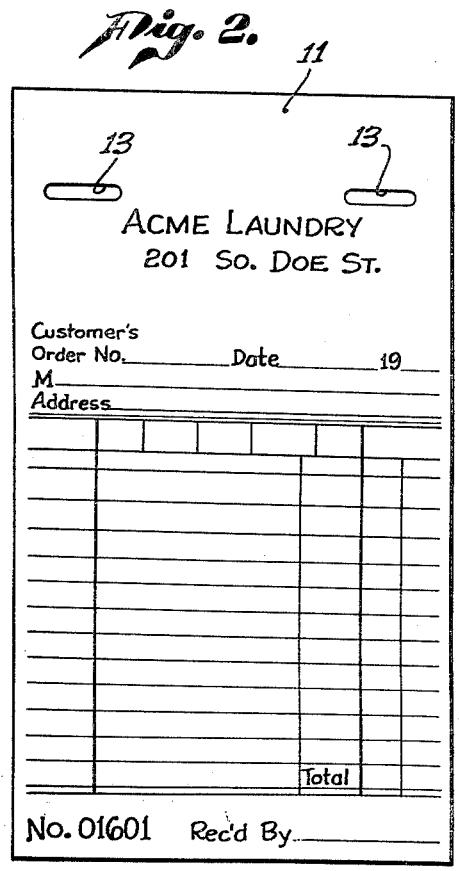
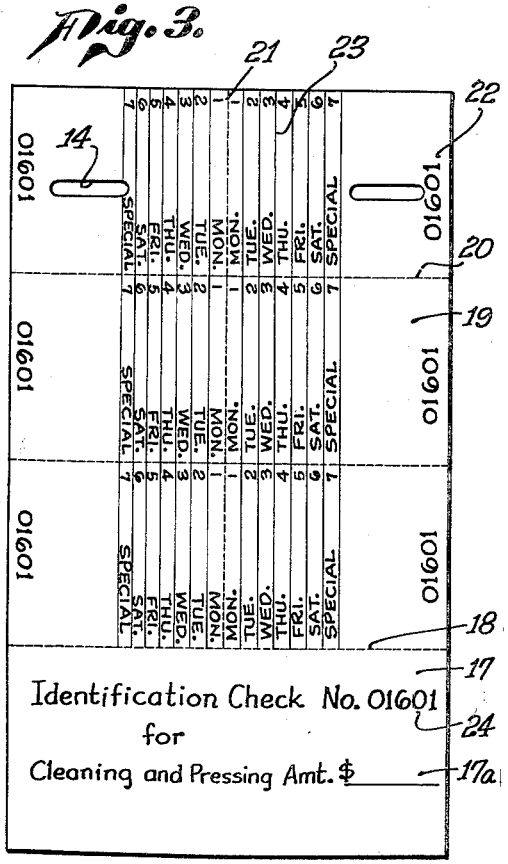
INVENTOR.
HENRY C. WILLIAMS,
By Hazard & Miller
ATTORNEYS.

UNITED STATES PATENT OFFICE 2,363,919

AUTOGRAPHIC REGISTER TICKET FOR CLEANERS AND DYERS

Henry C. Williams, North Hollywood, Calif.

Application October 1, 1943, Serial No. 504,580

2 Claims. (Cl. 282—21)

This invention relates to a supply of tickets or order slips primarily designed for use in conjunction with an autographic register, but which may be utilized in salesbooks if so desired.

Primarily, the invention concerns the provision of suitable order slips and accompanying identification checks and tags which may be advantageously used by concerns rendering service such as those of dry cleaners, pressers, and dyers. Heretofore, it has been common practice for cleaners on receiving several articles of wearing apparel to be cleaned or pressed to supply the customer with an identification check and to prepare an itemized list of the various articles of apparel that have been left for cleaning, pressing, or other work. Thereafter, the cleaner prepares identification tags that are attached to the articles of wearing apparel. These tags have identification marks applied to them associating the articles of apparel with the identification check that has been given to the customer. The preparation of these identification tags requires considerable time and labor as well as material and some kind of record must be kept to associate the prepared tags with the identification checks supplied to the various customers.

The present invention contemplates the provision of three superposed tickets, the uppermost of which provides for the recording of name and address of the customer, the itemizing of the various articles of wearing apparel that have been left for cleaning, pressing, or other service, the totalling of the amount, and possibly other notations. The lowermost slip or ticket may be an exact or substantial duplicate of the uppermost ticket and the notations made on the uppermost ticket are intended to be reproduced thereon by means of carbon paper or other reproducing medium. The intermediate slip or ticket is divisible into sections, one section constituting an identification check that is delivered to the customer upon receipt of the garments and which functions as a receipt. The total amount as recorded on the uppermost slip or ticket may be recorded or simultaneously reproduced thereon by means of carbon paper. The balance or remainder of the intermediate slip or ticket is divisible into identification tags that are applicable to the garments to identify them during and after the cleaning and the pressing operations. All of the identification tags, the identification check, and the uppermost and lowermost slips bear the same identification number. In this manner, the name and address of the customer may be recorded at the time that the garments are left with the cleaner, a permanent record simultaneously made of the transaction on the lowermost slip or ticket and identification checks and tags are readily available which have corresponding numbers to those on the uppermost and lowermost slips which facilitate the labelling or identifying of the garments and their proper identification with the customer's identification check.

When the invention is embodied in a strip form suitable for use with an autographic register the tickets or slips form parts of strips of indefinite length and are defined from each other by perforated lines. They have aligned apertures by which they may be fed through the register by means of the feeding mechanism. The lowermost strip in conformity with conventional practice is adapted to be retained in the register and refolded therein to retain a permanent record of the transaction. The intermediate tickets are adapted to be removed from the register and divided into the identification check and tags and the uppermost ticket placed with the garments from which a book record may be made.

Another object of the invention is to provide a construction as above described wherein the intermediate ticket is divisible into sections forming identification tags disposed on opposite sides of a line on which they are readily separable or divisible whereby the tags may be folded relatively to each other on this line prior to separation. The identification tags have representations thereon of the various days of the week or lot numbers which are arranged progressively from the line on the opposite sides thereof. In this manner the cleaner or dyer on informing the customer that his garments will be ready for delivery on a given day of the week can fold the portion of the middle ticket upon the mentioned line and in a single trimming operation trim off the designations of the days of the week prior to the day on which the order is due to be completed. In this manner all identification tags can be quickly caused to indicate when the order is due to be completed and ready for delivery.

With the foregoing and other objects in view, which will be made manifest in the following detailed description and specifically pointed out in the appended claims, reference is had to the accompanying drawing for an illustrative embodiment of the invention, wherein:

Figure 1 is a perspective view of a pad of autographic register tickets embodying the present invention;

Fig. 2 is a plan view of one of the tickets of the uppermost strip and as the tickets of the lowermost strip have the same appearance, this view will serve to indicate the nature of the tickets of that strip; and Fig. 3 is a plan view of one of the corresponding tickets of the intermediate strip.

Referring to the acompanying drawing wherein similar reference characters designate similar parts throughout, the invention comprises three separate strips 10, 11, and 12 divisible such as by perforated lines at spaced intervals into individual tickets arranged in superposed relationship. If the invention is embodied in a strip suitable for use in an autographic register the three strips 10, 11, and 12 are manifolded back and forth as shown in Fig. 1, into a pack in conformity with conventional strips of tickets used in autographic registers. If desired, however, groups of three superposed tickets may be stacked and bound together in salesbooks form. When designed for use with an autographic register the three strips have aligned slots or apertures 13, 14, and 15 which serve to be engaged by the advancing or feed mechanism of the autographic register.

The tickets of the uppermost and lowermost strips are exact or substantial duplicates of each other. They may have the name and address of the cleaner printed thereon and suitable spaces arranged for listing the customer's order number, the date, the customer's name and address, an itemized listing of the various articles and the name of the person receiving the same on behalf of the customer. The lowermost space used for itemizing the various articles is designed to have the total charge listed therein.

These tickets also have printed thereon a number indicated at 24, the number being the same on the uppermost and lowermost tickets. The corresponding ticket of the intermediate strip 11 is divisible into sections. One such section indicated at 17 is separable from the balance or remainder of the tickets such as by a perforated line 18. This section serves as an identification check that may be delivered to the customer. It has a space thereon for recording the total amount as written at the bottom of the itemized list on the uppermost ticket, such space being indicated at 17a. This space is in registry with the lowermost space on the itemizing list and is designed to have the amount reproduced by means of a small sheet of carbon paper.

The balance or remainder of the intermediate ticket is divisible into identification tags 19, division being accomplished by transverse perforated lines 20 and a central longitudinal perforated line 21. On these tags 19 there are printed numbers 22 corresponding to the number 16 on the uppermost and lowermost tickets.

The identification tags may have adjacent one edge thereof designations of the days of the week indicated at 23, and also a listing such as "Special." If desired there may be a parallel column of numbers near the opposite edge of each identification tags.

The improved pack of manifolded strips may be deposited in an autographic register in the conventional manner and the three strips simultaneously fed therethrough. When the cleaner receives the articles of apparel to be cleaned or pressed, the ticket of the uppermost strip is appropriately filled out and the articles of apparel itemized thereon. The total charge is also listed. By means of the carbon paper or equivalent transfer media the total charge will be listed on the identification check 17 at the space 17a. Also, all notations will be reproduced on the lowermost strip 12. This strip is intended to be retained in the autographic register and form a permanent record of the transaction. In certain instances, the lowermost strip may be dispensed with entirely if no permanent record is desired.

When the ticket of the uppermost strip has been filled out, this ticket is detached and removed from the register and placed with the articles of apparel to enable a book entry to be made therefrom. The subjacent ticket of the intermediate strip is also removed from the register at the same time. The identification check portion 17 can be torn off and delivered to the customer. This identification check portion bears a number 24 which corresponds to numbers 16 and 22. The remaining portion of the intermediate ticket can then be folded on the longitudinal center line 21. If the cleaner has promised that the garments will be ready for delivery on a certain day of the week, such as for example Thursday, the folded portion of the intermediate ticket is then cut with a single trimming operation parallel to fold line 21 cutting off those portions of the identification tags bearing the designations "Mon. Tue. and Wed." The identification tags can then easily be separated from each other by tearing on the perforated lines 20. Thus six identification tags are instantly available bearing the corresponding identification number 22 and indicating when the garments are to be completed and ready for delivery. These individual tags can then be applied to the garments and remain attached thereto until the servicing operations are completed. Strips 10 and 12 may be formed of any conventional or preferred type of paper. It is preferable however to form the intermediate strip 11 of a parchment type of paper which is inherently highly resistant to cleaning solvents, bleaches, steam, or other treatment to which the garments may be subject. Other treated papers or fabrics in lieu of parchment paper may be used.

Some small cleaning concerns merely undertake to receive the garments and send them to a larger central cleaning concern who may handle the garments in numbered lots. The column of numbers on the identification tags opposite the designations of the days of the week may be utilized to identify the garments with lot numbers. The tags may be simultaneously trimmed off to indicate the appropriate lot number. It is not necessary that the three strips be manifolded together although this is now conventional practice in autographic registers. The number of identification tickets may also be varied from the number shown although six is ordinarily adequate to take care of the average order. If more than six identification tickets are required, a succeeding set of tags may be obtained by filling out a succeeding set of tickets to obtain an additional six identification tags. If six identification tags is more than that required for the order the excessive number of tags is merely discarded.

The identification check 17 that is delivered to the customer affords added protection both to the cleaner and the customer. It will be noted that this tag does not bear the name of the cleaner. Consequently, if the customer should lose the identification check 17 the finder is not advised as to where the garments have been left and obtain them for the cleaning bill. Also, should the finder present the identification check to the proper cleaner as it is customary for the cleaner to inquire of the name of the person presenting the identification check the cleaner can instantly determine whether the bearer of the identification check is the same person to whom the identification check was delivered by comparing the name given with the name as listed on the corresponding ticket of either strip 10 or strip 12. In this manner added protection is obtained.

In lieu of having the designations of the days of the week on the identification tags special colors may be used in the corresponding spaces.

From the above described construction it will be appreciated that the improved autographic register ticket facilitates the supplying of appropriate number of identification tags all of which bear an identification number corresponding to the identification check delivered to the customer and to the corresponding number of the slips or tickets on strips 10 and 12. Furthermore, the arrangement of the designation of the days of the week or of code, or lot numbers on the identification tags is such that by a single trimming operation all of these identification tags may be simultaneously caused to indicate the proper lot number or the day on which the work is to be completed and ready for delivery. No separate time-consuming operation is required to prepare the individual identification tags other than the single trimming operation which will render all tags identical.

Various changes may be made in the details of construction without departing from the spirit and scope of the invention as defined by the appended claims.

I claim:

1. As a new article of manufacture, triplicate strips of superposed separable tickets having means by which they may be aligned and fed through an autographic register, the tickets of the upper and lowermost strips having appropriately designated spaces in which the identity of the customer may be written and the items of the customer's business itemized, the tickets of the intermediate strip being divisible into sections constituting an identification check and identification tags, said identification tags, identification check, and tickets of the uppermost and lowermost strips bearing the same identification number, and the identification check and the tickets of the uppermost and lowermost strips having aligned appropriately designated spaces in which the total amount may be written, the identification tags being arranged on the opposite sides of a fold line and bearing designations of the days of the week which when these tags are folded will be brought into corresponding superposed registering relationship, as and for the purpose described.

2. As a new article of manufacture, triplicate strips of superposed separable tickets arranged for duplicate writing thereon, the tickets of the uppermost and lowermost strips having appropriately designated spaces in which the identity of the customer may be written and the items of the customer's business itemized, the tickets of the intermediate strip being divisible into an identification check and identification tags, the tickets of the uppermost and lowermost strips, each identification tag and the identification check bearing the same identification number and the tickets of the uppermost and lowermost strips and the identification check having aligned appropriately designated spaces arranged for duplicate writing of the total amount of the customer's business, the identification tags being arranged on opposite sides of a fold line and bearing designations of the days of the week, which when these tags are folded upon the fold line will be brought into corresponding superposed registering relationship as and for the purpose described.

HENRY C. WILLIAMS.